United States Patent
Bolin et al.

(10) Patent No.: US 10,721,730 B2
(45) Date of Patent: Jul. 21, 2020

(54) METHODS AND DEVICES FOR FINDING RFID TAGS

(71) Applicant: Sony Mobile Communications Inc., Tokyo (JP)

(72) Inventors: Thomas Bolin, Lund (SE); Erik Bengtsson, Eslöv (SE); Peter Karlsson, Lund (SE); Zhinong Ying, Lund (SE); Linh Trang, Aakarp (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/143,734

(22) Filed: May 2, 2016

(65) Prior Publication Data

US 2017/0171849 A1 Jun. 15, 2017

(51) Int. Cl.
| | |
|---|---|
| *H04W 72/04* | (2009.01) |
| *H04W 4/70* | (2018.01) |
| *H04W 4/80* | (2018.01) |
| *H04W 4/90* | (2018.01) |
| *H04L 12/26* | (2006.01) |
| *H04W 4/02* | (2018.01) |

(52) U.S. Cl.
CPC ........... *H04W 72/044* (2013.01); *H04L 43/10* (2013.01); *H04W 4/025* (2013.01); *H04W 4/70* (2018.02); *H04W 4/80* (2018.02); *H04W 4/90* (2018.02); *H04W 72/0446* (2013.01); *H04W 72/0453* (2013.01)

(58) Field of Classification Search
CPC . H04W 72/044; H04W 72/042; H04W 4/025; H04W 72/0446; H04W 72/0453; H04W 4/22; H04W 4/005; H04W 4/008; H04L 43/10
See application file for complete search history.

(56) References Cited

U.S. PATENT DOCUMENTS

| | | | |
|---|---|---|---|
| 2003/0104848 A1 | 6/2003 | Bridgeglall | |
| 2008/0018467 A1 | 1/2008 | Estevez et al. | |
| 2009/0167499 A1* | 7/2009 | Koo | G06K 7/0008 340/10.1 |
| 2009/0224892 A1* | 9/2009 | Nicholls | G01S 13/825 340/10.42 |
| 2010/0159953 A1 | 6/2010 | Aubert et al. | |

(Continued)

FOREIGN PATENT DOCUMENTS

| | | |
|---|---|---|
| EP | 2950240 A1 | 12/2015 |
| WO | 2009048308 A2 | 4/2009 |

OTHER PUBLICATIONS

3rd Generation Partnership Project, "3rd Generation Partnership Project; Technical Specification Group Radio Access Network; Study on provision of low-cost Machine-Type Communications (MTC) User Equipments (UEs) based on LTE (Release 12)", Technical Report, 3GPP TR 36.888 V12.0.0, Jun. 1, 2016, pp. 1-55, 3GPP, France.

(Continued)

*Primary Examiner* — Pao Sinkantarakorn
*Assistant Examiner* — Kabir U Jahangir
(74) *Attorney, Agent, or Firm* — Tucker Ellis, LLP

(57) ABSTRACT

A cellular network allocates resources to a device for transmission of a signal for finding at least one RFID tag. The device uses the resources allocated by the cellular network to transmit a signal to the at least one RFID tag in a frequency band licensed to the cellular network.

10 Claims, 13 Drawing Sheets

(56) References Cited

U.S. PATENT DOCUMENTS

| | | | | |
|---|---|---|---|---|
| 2010/0207737 A1* | 8/2010 | Park | .................... | G06K 7/0008 |
| | | | | 340/10.2 |
| 2011/0260839 A1 | 10/2011 | Cook et al. | | |
| 2012/0146774 A1* | 6/2012 | Kasai | ................... | G06K 7/0008 |
| | | | | 340/10.42 |
| 2013/0060520 A1* | 3/2013 | Amor | ................... | G01C 15/008 |
| | | | | 702/154 |
| 2017/0074964 A1* | 3/2017 | Xu | .......................... | G01S 19/24 |

OTHER PUBLICATIONS

3rd Generation Partnership Project, "3rd Generation Partnership Project; Technical Specification Group GSM/EDGE Radio Access Network; Cellular system support for ultra-low complexity and low throughput Internet of Things (CIoT) (Release 13)", Technical Report, 3GPP TR 45.820 V13.0.0, Aug. 1, 2015, pp. 1-495, 3GPP, France.

3rd Generation Partnership Project, "3rd Generation Partnership Project; Technical Specification Group Services and System Aspects; Study on architecture enhancements for Cellular Internet of Things (Release 13)", Technical Report, 3GPP TR 23.720 V13.0.0, Mar. 1, 2016, pp. 1-94, 3GPP, France.

European Office Action for corresponding European Application No. 15820068.3, dated Apr. 20, 2020, 4 pages.

* cited by examiner

METHODS AND DEVICES FOR FINDING RFID TAGS

This application claims priority to the International Application No. PCT/EP2015/079812 filed 15 Dec. 2015, the entire contents of which are incorporated by reference herein in their entirety.

FIELD OF INVENTION

Embodiments of the invention relate to wireless communication. Embodiments of the invention relate in particular to communication techniques between a device, e.g. a terminal of a cellular network, and Radio Frequency Identification Device (RFID) tags

BACKGROUND

RFID tags are widely used. Due to their low cost and compact size, RFID tags may be deployed with a high density. RFID tags may be deployed as stationary RFID tags that are attached at a given location, e.g. inside a building or in urban areas, or as mobile RFID tags. Such mobile RFID tags may be attached to objects, such as cash, articles of purchase, or living beings such as humans or animals.

With increasing popularity of mobile data communication, an ever increasing number of devices is equipped with a radio interface for communication with a cellular network. It would be desirable to provide techniques that allow devices equipped with a wireless interface for communication with a cellular network to also take advantage of the RFID tags that may be deployed with high density in at least some areas. It would be desirable to provide techniques that allow devices equipped with a wireless interface for communication with a cellular network to communicate with RFID tags in manner that affords cellular network control for the process of finding RFID tags.

SUMMARY

There is a continued need in the art for devices, systems and methods which address at least some of the above needs. There is a need for devices, systems and methods that facilitate interaction between a device, e.g. a mobile terminal of a cellular network, and RFID tags.

According to embodiments, a cellular network may sanction and schedule the use of cellular network resources by a device for transmitting a signal, e.g. a ping signal that may be a short pulse, to RFID tags. The device may request allocation of cellular network resources for finding one or several RFID tags. In response to receiving a resource allocation from the cellular network, the device may transmit a signal, e.g. a ping signal, over the wireless interface that is also used for communication with the cellular network to find RFID tags.

According to embodiments, a RFID tag is responsive to a signal in a frequency band that is licensed to the cellular network operator. The RFID tag may be operative to generate a tag response that also has a frequency in the frequency band that is licensed to the cellular network operator.

Tag responses received by the device from the one or several RFID tags may be processed further. For illustration, the device may use the tag responses for position determination, e.g. in situations in which GPS-based positioning is not readily available for, for object tracking, or for other purposes.

The existing wireless interface that is provided in the device for communication with a base station of the cellular network may also be used for finding RFID tags positioned in proximity to the device.

Enhanced network control is attained for finding RFID tags. For illustration, the base station or another cellular network node may request a device such as a user equipment to transmit a signal using cellular network resources to ping for RFID tags.

A method according to an embodiment comprises receiving, by a device, an allocation of resources for transmission of a signal to find at least one RFID tag, the resources being allocated by a cellular network. The method comprises using, by the device, the resources allocated by the cellular network to transmit a signal to find the at least one RFID tag, the signal being transmitted in a frequency band licensed to the cellular network.

The signal transmitted to find the at least one RFID tag may be transmitted over a wireless interface of the device that is also used for communication with the cellular network.

The method may further comprise transmitting, by the device, a resource allocation request to the cellular network to request the allocation of the resources for transmission of the signal to the at least one RFID tag. The request for resources may indicate to the cellular network that the device intends to find RFID tags located in proximity to the device.

The method may comprise receiving, by the device, scheduling information from the cellular network, and transmitting the signal to find the at least one RFID tag in accordance with the received scheduling information. The cellular network may thereby sanction and schedule the pinging of RFID tags by the device.

The method may comprise receiving, by the device, a tag response from the at least one RFID tag in response to the signal transmitted by the device.

The device may receive the tag response having a frequency in the frequency band licensed to the cellular network.

The device may receive a tag response from an RFID tag which is a passive RFID tag. The tag response received from the passive RFID tag may have a frequency that is identical to the frequency of the signal transmitted by the device to find the at least one RFID tag.

The tag response received from the passive RFID tag may have a frequency that is different from the frequency of the signal transmitted by the device to find the at least one RFID tag.

The passive RFID tag may start generating the tag response immediately when it receives the signal from the device. A time delay between generation of the signal and receipt of the tag response detected by the device may thus be attributed exclusively to the propagation time. Alternatively, the passive RFID tag may have a circuit that ensure a pre-defined, fixed delay between receipt of the signal at the RFID tag and generation of the tag response.

The device may receive a tag response from an RFID tag which is an active RFID tag. The tag response received from the active RFID tag may have a frequency that is different from the frequency of the signal transmitted by the device to find the at least one RFID tag. This facilitates discrimination between active and passive RFID tags.

The RFID tags may be operative such that the device may discriminate a tag response originating from an active RFID tag from a tag response originating from a passive RFID tag. The discrimination between active and passive RFID tags may be implemented based on time differences between each tag response originating from an active RFID tags and each tag response originating from a passive RFID tag. The discrimination between active and passive RFID tags may be implemented based on frequency differences between each tag response originating from an active RFID tags and each tag response originating from a passive RFID tag.

The active RFID tag may have an interface for communication with an evolved machine type communication (eMTC) radio access network (RAN).

The active RFID tag may have an interface for communication with a NarrowBand Internet of Things (NB-IoT) RAN.

The transmission of the tag response by the active RFID tag may be scheduled by a base station.

The RFID tag may operate in synchronization with the device. The time synchronization may be coordinated by the base station.

The tag response from the active RFID tag may include timing information. The timing information may be used by the device to determine the distance between the RFID tag and the device.

The active RFID tag may be operative to use selectively either a frequency in the frequency band licensed to the cellular network or a different radio communication resource, e.g. a re-source in an unlicensed band, when transmitting the tag response.

The device may receive a plurality of tag responses from a plurality different RFID tags positioned in proximity to the device.

The method may comprise determining a position of the device or of an RFID tag based on the tag response(s). The position may be determined by the device autonomously or in co-operation with a cellular network node or server.

Determining the position may comprise determining a tag position of the at least one RFID tag from which the tag response was received, and determining the position of the device based on the tag position.

Determining the tag position may comprise querying a data base for the tag position using a tag identifier included in the tag response.

The database may be maintained by a cellular network node, e.g. the base station, or a server. At least part of the database may be stored locally at the device. The database may have stored therein information on RFID tag coordinates respectively in association with a tag identifier.

The device may establish a distance between the device and an RFID tag from which a tag response was received based on the tag response.

The distance may be established based on a signal level and/or based on a time delay until the tag response was received.

The position of the device may be determined based on the tag response(s) while the device is positioned indoor or if satellite based positioning is otherwise not available.

The device may be operative to determine whether satellite-based positioning is available. If a satellite-based positioning is available, the device may determine its position based on signals received from satellites. If satellite-based positioning is not available, the device may determine its position by requesting resources licensed to the cellular network for pinging RFID tags, by using the allocated resources for pinging the RFID tags, and by processing the tag responses received from the RFID tags to determine several coordinates of the device position.

The device may be operative to discriminate whether tag responses have been received from passive RFID tags or active RFID tags. The device may be operative to discriminate tag responses from passive RFID tags and active RFID tags based on their frequencies. The device may be operative to discriminate tag responses from passive RFID tags and active RFID tags based on their times of arrival.

Positioning may be implemented in such a manner that close-by RFID tags are prioritized over RFID tags that are further away. Signal level or time of arrival may be indicative of the distance between the respective RFID tag and the device and may be taken into account when determining which RFID tag responses are processed further for position determination. In some embodiments, passive RFID tags may be prioritized over active RFID tags for position determination, e.g., if a density of passive tags is higher than a density of active tags so that better accuracy is attainable on average for positioning that prefers tag responses from passive RFID tags over tag responses from active RFID tags. If tag responses have been received from at least three passive RFID tags, the position of the device may be determined based on the tag responses from the at least three passive RFID tags. Otherwise, the position of the device may be determined based on at least one tag response received from at least one active RFID tag.

The device may be operative to determine its position including a height coordinate at which the devices located by processing the tag responses.

The device may be operative to find RFID tags for purposes other than device position de-termination, e.g. for tracking RFID tags. To this end, the device may request position information for an RFID tag. The request for position information may be sent to a cellular network node or server. If the RFID tag is stationary tag, the device may receive the coordinates of the stationary RFID tag. If the RFID tag is a mobile RFID tag, the device may receive the last known position in response to requesting the position information. The device may then request resources for pinging the mobile RFID tag when the device is located in proximity to the last known position of the mobile RFID tag.

The device may be operative to provide updated position information for RFID tags to the cellular network or to a server.

The device may be operative to transmit the signal for finding the RFID tags in the 850 MHz band/or in the 900 MHz band.

The device may be a dedicated tag reader.

The device may be a cellular phone or portable computer having tag reader functionality.

An RFID tag according to an embodiment comprises a wireless interface to receive a signal in a frequency band licensed to a cellular network. The RFID tag comprises a circuit to generate a tag response for transmission to the device in response to receipt of the signal.

The RFID tag may be operative to receive the signal in the 850 MHz band and/or in the 900 MHz band.

The RFID tag may be operative to generate the tag response such that the tag response includes coordinates of the RFID tag and/or an identifier of the RFID tag.

The wireless interface may be operative to communicate with a machine type communication (MTC) radio access network (RAN), an evolved MTC (eMTC) RAN or a Narrow Band Internet of Things (NB-IoT) RAN. The RFID tag may be operative to receive updated information from the cellular network, which may be a cellular IoT network. The updated information may include position updates for the RFID tag, for example.

The circuit of the RFID tag may be operative to generate the tag response in the frequency band licensed to the cellular network.

The RFID tag may be operative to transmit the tag response in the 850 MHz band/or in the 900 MHz band.

The RFID tag may be operative to transmit the tag response in resources that are set by the cellular network. The RFID tag may be operative to transmit the tag response in accordance with a resource allocation from the cellular network. The resource allocation may be received at the wireless interface.

The RFID tag may be operative to transmit the tag response in resources that have a fixed, pre-defined relation relative to the resources in which the RFID tag received the signal. The RFID tag may be operative to transmit the tag response in resources licensed to the cellular network which have fixed, pre-defined offsets in frequency and/or time relative to the re-sources in which the signal was received from the device. The offsets may be configured by the cellular network.

The RFID tag may be a passive RFID tag operative to use the energy received in the signal for generating the tag response. The positive RFID tag may be operative to generate the tag response such that it is transmitted at the same frequency at which the signal was received.

The RFID tag may be an active RFID tag. The active RFID tag may be operative to generate the tag response such that it is transmitted at a different frequency than the signal which was received by the RFID tag. Despite the change in frequency, both the signal and the tag response may respectively have frequencies included in a frequency band licensed to the cellular network operator that sanctions the RFID tag finding.

The active RFID tag may be an IoT device operative to communicate with a cellular IoT net-work over an NB-IoT RAN.

A device according to an embodiment comprises a wireless interface operative for communication with a radio access network of a cellular network, and an electronic circuit operative to control the wireless interface to use resources allocated by the cellular network for transmission of a signal to find at least one RFID tag, the signal having a frequency in a frequency band licensed to the cellular network.

The device may be a handset or another mobile terminal. The device may be an LTE user equipment (UE).

The device may have RFID tag reader function, using the same wireless interface that may also be used for communication with the cellular network.

The electronic circuit may be operative to control the wireless interface to transmit a resource allocation request to the cellular network to request allocation of the resources for transmission of the signal to the at least one RFID tag.

The wireless interface may be operative to receive a tag response from the at least one RFID tag in response to transmission of the signal, the tag response being received in the frequency band licensed to the cellular network.

The electronic circuit may be operative to process the tag response for position determination.

The device may be a user equipment (UE).

A cellular network node according to an embodiment may comprise an electronic circuit operative to sanction the transmission of a signal by a device for finding RFID tags located in proximity to the device.

The cellular network node may be a base station, e.g. an eNodeB.

The cellular network node may be operative to perform a resource allocation for transmission of the signal by the device. The cellular network node may sanction and schedule the trans-mission of the signal by the device.

The cellular network node may comprise a storage medium or may be operative to retrieve data from a storage medium, which has stored therein information on tag positions. The in-formation on tag positions may include information on lateral coordinates as well as an height coordinate of the respective RFID tag.

The cellular network node may be operative to respond to a request for tag position information by providing the tag position if the RFID tag is a stationary RFID tag. The cellular network node may be operative to respond to the request for tag position information by providing the last known tag position if the RFID tag is a non-stationary RFID tag.

The cellular network node may be operative to initiate the transmission of the signal by the device for RFID tag finding. The transmission of the signal for tag finding may be initiated by detection of an emergency situation, e.g. when an emergency number is dialed.

The cellular network node may be operative to schedule recurring time slots for transmission of the signal by the device for RFID tag finding.

The cellular network node may be operative to schedule a tag response. The cellular network node may dynamically assign resources for transmission of the tag response. The cellular network node may reserve the resources for transmission of the tag response in such a manner that, in the time frequency resource grid, the resources in which the tag response may be transmitted have a fixed offset along the time and frequency axes relative to the re-sources in which the signal is transmitted for tag finding.

The cellular network node may be operative to allocate a recurring time slot for multiple de-vices, e.g. multiple user equipments, to respectively transmit a signal for tag finding.

A system according to an embodiment comprises an RFID tag according to an embodiment and a device according to an embodiment.

The system may further comprise a cellular network node that is operative to allocate re-sources in a frequency band licensed to the cellular network for transmission of a signal by the device to find the RFID tag.

The RFID tag may be operative to work in a frequency band licensed to the cellular network to which the cellular network node belongs.

In the methods, devices, and systems according to embodiments, the transmission of the signal for tag finding by the device may be initiated by various events. A base station or other cellular network node may initiate the transmission of the signal. The transmission of the signal may be alternatively or additionally be initiated when the device itself, e.g. a handset, or the base station detects that an emergency situation occurs. The dialing of an emergency number may trigger the device to request resource allocation to transmit the signal for tag finding.

In the methods, devices and systems according to an embodiment, the base station may initiate the device to transmit the signal in the resources licensed to the cellular network. The base station may also allocate resources for the tag response such that those resources may be changed dynamically under the control of the base station or such that those resources have a fixed time and frequency offset in the time frequency resource grid relative to the resource in which the signal is transmitted. The base station may also allocate recurring time slots, in particular periodically recurring time slots, for one or multiple user equipments to respectively transmit the signal for tag finding. This may be beneficial e.g. in dense environments in order for the user equipments to be synchronized when pinging. In view of the high energy with which the signal may be transmitted, which may be maximum transmit power, interference issues may thereby be mitigated. User equipments may, but do not need to use the time slot allocated by the base station.

Devices, systems and methods according to embodiments allow a device to use resources licensed to a cellular network for finding RFID tags located in proximity to the device. The cellular network is provided with control over the usage of cellular network resources that are used for tag finding. The cellular network base station or another cellular network node may sanction and schedule the use of resources for pinging RFID tags.

Devices, systems and methods according to embodiments may be used in a wide variety of scenarios. For illustration, the devices, systems and methods according to embodiments may be used for positioning procedures, e.g. when satellite-based positioning techniques are not available because a device is located indoor. Alternatively or additionally, the devices, systems and methods according to embodiments may be used for tracking objects that are equipped with an RFID tag.

BRIEF DESCRIPTION OF THE DRAWINGS

Embodiments of the invention will be described with reference to the accompanying drawings in which the same or similar reference numerals designate the same or similar elements.

DETAILED DESCRIPTION

Exemplary embodiments of the invention will be described with reference to the drawings. While some embodiments will be described in the context of specific fields of application, e.g. in the context of certain frequency bands and communication techniques, the embodiments are not limited to this field of application. The features of the various embodiments may be combined with each other unless specifically stated otherwise.

Figure 1:
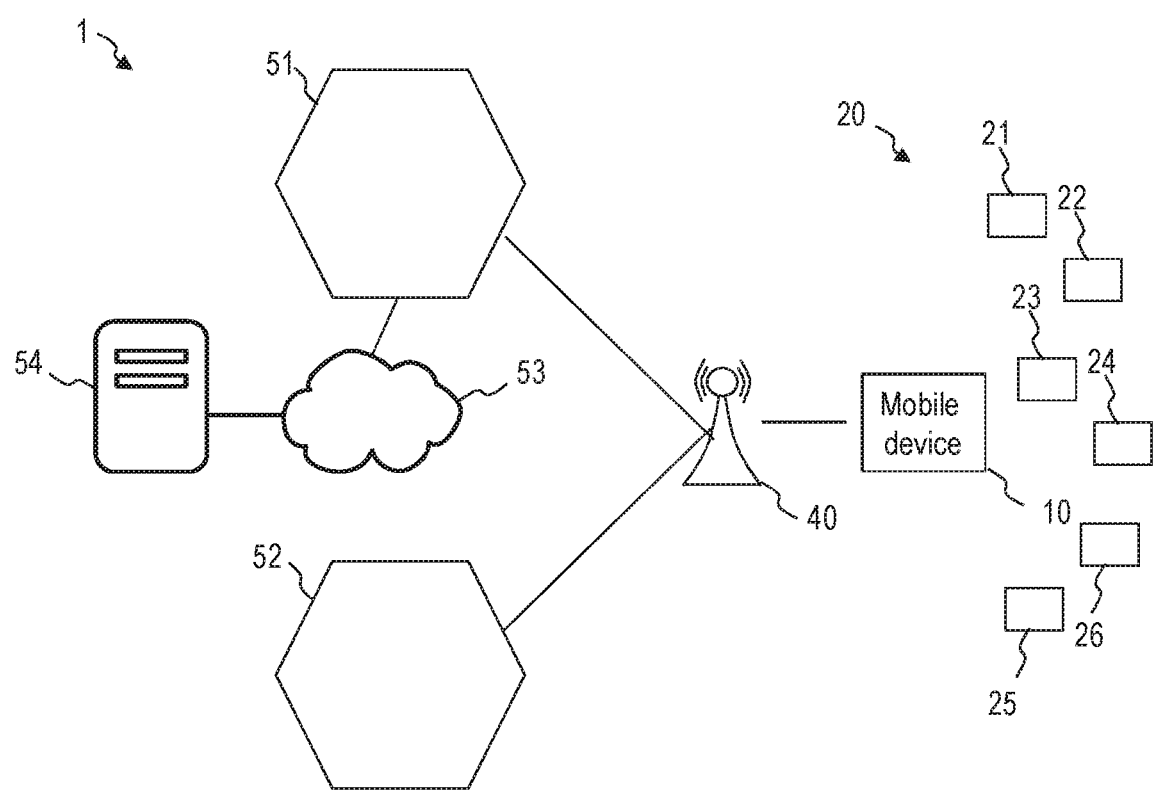
FIG. 1 is a schematic view of a system according to an embodiment.

FIG. 1 is a schematic view of a system 1 according to an embodiment. The system 1 comprises a device 10 and a plurality 20 of RFID tags 21-26. The plurality of RFID tags 20 may include passive RFID tags and active RFID tags. The plurality of RFID tags 20 may include stationary RFID tags and mobile RFID tags. The device 10 may be a handset, e.g. a mobile terminal of the cellular network, or may be a stationary user equipment acting as reader for tracking mobile RFID tags.

As will be described more detail below, a cellular network may sanction and schedule the use of cellular network resources for communication between the device 10 and the plurality of RFID tags 20 in the process of tag finding. A base station 40 may perform resource allocation for allocating spectral resources in the frequency band licensed to the cellular network for use by the device 10 in finding RFID tags that are positioned in proximity to the device 10.

The device 10 may be operative to communicate with the base station 40. The device 10 may engage in communication with cellular network nodes via a radio access network of the cellular network to request authorization for usage of cellular network resources for finding RFID tags. Different techniques may be employed for the cellular network to sanction and schedule the transmission of signals by the device 10 to RFID tags for finding RFID tags. The base station 40 or another cellular network node may monitor a trigger event and may request the device 10 to transmit a signal having a frequency in the frequency band licensed to the cellular network in response to detecting the trigger event. The device 10 may use the allocated resources to transmit a signal having a frequency in the frequency band licensed to the cellular network for finding RFID tags positioned in proximity to the device 10. Alternatively or additionally, the device 10 may transmit a request for allocation of resources to the base station 40 to request the cellular network to sanction and schedule the transmission of a signal that allows the device 10 to find RFID tags that are located in proximity to the device 10.

In response to transmission of a signal by the device 10, the device 10 may receive tag responses from RFID tags that are located in proximity to the device 10. The tag responses received from at least some of the RFID tags may respectively have a frequency that is also included in the frequency band licensed to the cellular network.

The base station 40 may not only allocate resources for the transmission of the signal by the device 10 for tag finding, but may also schedule the tag response(s). This may be implemented in various ways. The base station 40 may dynamically allocate resources for the tag response, such that the resource in which the tag response is transmitted may vary from one transmission to the subsequent one. The base station 40 may also configure at least one RFID tag in such a manner that the tag response is transmitted at a frequency and at a time that has a fixed offset alone one or both axes of the time frequency resource grid to the resource in which the signal was transmitted by the device 10 for tag finding.

The base station 40 may also reserve recurring time slots, e.g. periodically recurring time slots, for the transmission of the signal for tag finding by the device 10 as well as further user equipments (not shown in FIG. 1). The various user equipments may transmit their signal for tag finding in the same time slot, thereby mitigating interference issues with payload data transmissions between the cellular network and the user equipments.

The device 10 may further process the tag response received from one or several RFID tags. Different applications and corresponding processing techniques may be used. For illustration, the device 10 may perform a positioning procedure in which the position of the device 10 is determined. The position of the device 10 may be determined such that an elevation or altitude at which the device 10 is located is also determined. In order to determine the position of the device 10, the device 10 may identify the positions, e.g. the coordinate triplets that include a height coordinate, of the RFID tags from which tag responses were received. The device 10 may retrieve the tag positions from tag responses, from an internal storage of the device 10, or may query the base station 40, another cellular network node, or a server 54 connected to a wide area network 53 for the tag positions.

The device 10 may further be operative to determine a distance between the device 10 and an RFID tag from which a tag response was received. The distance may be determined based on a delay at which the tag response was received and/or based on a signal level of the tag response. Attenuation or time of flight of the tag response may thereby be used to determine the distance between the device 10 and the respective RFID tag.

The device 10, the base station 40, another cellular network node, or the server 54 may process the tag positions and, optionally, the distances between the device 10 and the respective RFID tags to determine the position at which the device 10 is located.

Alternatively or additionally to determining the position of the device 10, RFID tags located in proximity to the device 10 may also be found using spectral resources licensed to the cellular networks for tracking objects such as articles of purchase, animals, or persons.

The plurality of RFID tags 20 may include at least one stationary RFID tag. For each stationary RFID tag, the position information, e.g. a coordinate triplet, may be stored locally in their RFID tag, in the respective base station 40, in another cellular network node, or in a server 54 that may be separate from the cellular network. The stationary RFID tags may be fixedly attached to building walls, streets, or city furnishing objects such as street lighting. The plurality of RFID tags 20 may include at least one mobile RFID tag. For a mobile RFID tag, the last known position may be stored in the base station 40, another cellular network node, or the server 54 that may be resident outside of the cellular network.

At least some of the RFID tags may be operative for communication with a cellular network. The RFID tags and the device 10 may be operative for communication with different cellular networks. For illustration, the device 10 may be operative for communication with a first core network 51 of a first cellular network, which may be a legacy LTE network. RFID tags that have an interface operative for communication with a cellular network may be Internet of Things (IoT) devices that are operative to communicate with a cellular IoT core network (CN) 52 over a Machine Type Communication (MTC) RAN, an evolved MTC (eMTC) RAN or a NarrowBand IoT (NB-IoT) RAN. The Machine Type Communication (MTC) radio access network (RAN) may be operative as described in 3GPP TR 36.888 V12.0.0 (Rel-12) and or in accordance with eMTC for Rel-13. The CIoT network may be operative as described in 3GPP TR 45.820 and 3GPP TR 23.720. The CIoT network may be operative as described in 3GPP TR 45.820 V13.0.0 (Rel-13) and 3GPP TR 23.720 V1.0.0 (Rel-13).

The base station 40 may be connected to both core networks 51, 52. While a base station 40 connected to both core networks is shown in FIG. 1, the base station 40 may comprise two separate logical units that serve as a base stations for the device 10 and as base station for the RFID tags that are operable for communication with the CIoT, respectively. In still further embodiments, the base station for the device 10 and as base station for the RFID tags that are operable for communication with the CIoT may be physically separate entities.

The spectral cellular network resources that may be allocated for communication between the device 10 and the RFID tags 20 may depend on the geographical area in which the de-vice 10 and the RFID tags 20 are being used. For illustration, depending on the geographical deployment area, the licensed cellular network frequencies may be included in the 850 MHz band or in the 900 MHz band. Irrespective of where the cellular network and the device 10 are being installed, the cellular network may be operative to allocate some of its resources to the device 10 for use in finding RFID tags that are located in proximity to the device 10.

The plurality of RFID tags 20 may define a tag network that is similar to a phantom cell. Each area associated with an active RFID tag may include a plurality of stationary and, optionally, also mobile passive tags. Such a tag system may support the accurate positioning for both indoor and outdoor applications. A local or distributed server may maintain a database of tag positions. The database of tag positions may be updated, for illustration men an active RFID tag or a device 10 that tracks tag positions reports a change in tag position.

When the device 10 only navigates in a small area, the required position information for the RFID tags may also be maintained locally in the device 10.

A local or distributed server may be used to assist the device 10 in navigation tasks. For illustration, when positioning of the device 10 is to be performed in a larger area, the server may provide assistance to the device 10. The server may provide information on tag positions to the device 10 when queried by the device 10 using identifiers for the RFID tags. The server may be a local server or distributed server. The server may be integrated into the base station 40, in other cellular network node, or may be provided separately therefrom.

The licensed frequency bands of 850 MHz or 900 may provide communication range between the device 10 and the passive RFID tag which may be in the range of between 1 m and 12 m, for example. Active RFID tags may have a range that exceeds this range, e.g. a range of between hundred metres up to 1 km depending on the environment.

While only one device 10 operable to find RFID tags using resources licensed to the cellular network is shown in FIG. 1, it will be appreciated that a plurality of such devices 10 may be deployed. The plurality of such devices 10 may check or monitor the distribution of mobile RFID tags. Such a network of devices 10 that respectively find mobile RFID tags located in their proximity by transmitting a signal in resources licensed to the cellular network and by evaluating the tag response received in response thereto may have various applications. The distribution of mobile RFID tags may be monitored in an exhibition center or a shopping mall. Tags attached to living beings such as animals or persons may be monitored by a network formed by a plurality of devices 10 that act as tag readers to assist in finding children or elderly people.

The use of resources licensed to the cellular network for tag finding may be initiated in various ways. The use of such licensed resources for the transmission of the signal by the device 10 for tag finding may be initiated by the base station 10. The use of such licensed resources for the transmission of the signal by the device 10 for tag finding may be initiated when the user dials an emergency number on the device 10. In this case, high quality positioning of the device 10 may be of particular relevance. The determination that an emergency number has been dialed or another detection of emergency situations may be performed by the device 10 or the base station 40.

Devices, methods, and systems according to embodiments will be described in more detail with reference to FIG. 2 to FIG. 18.

Figure 2:
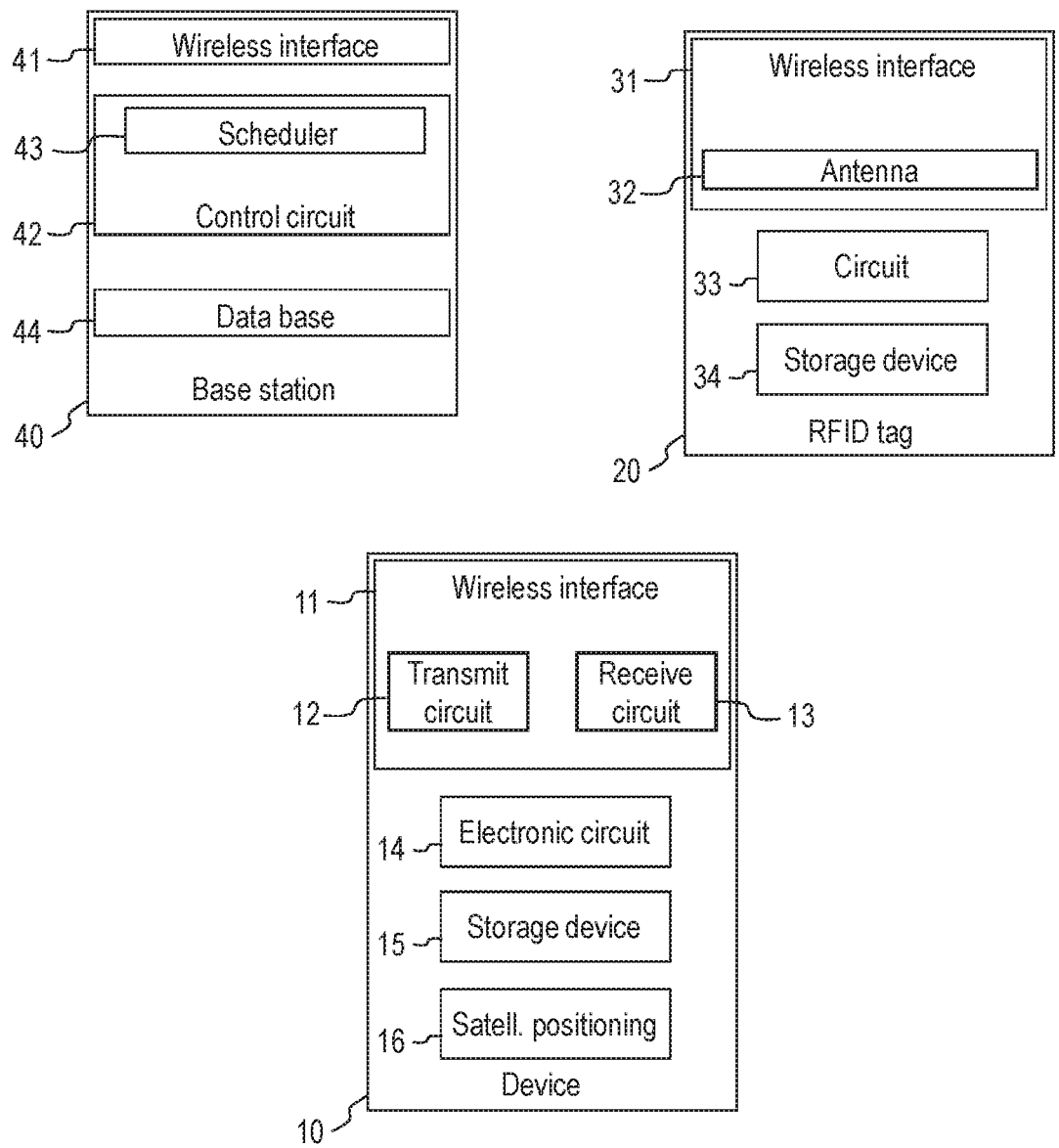
FIG. 2 is a block diagram of a system according to an embodiment.

FIG. 2 is a block diagram of a system including a device 10, an RFID tag 21, and a base station 40 according to an embodiment. The device 10 is a terminal of the cellular network, with the base station 40 providing radio access functionality. The device 10 may be a handset. The device 10 may be a UE of an LTE cellular network. The device 10 may be a mobile handset or may be stationary.

The device 10 has a wireless interface 11 which may include a transmit circuit 12 and a receive circuit 13. The wireless interface 11 may be operative to transmit and receive signals to and from the base station 40. The wireless interface 11 may be operative to receive a re-source allocation from the base station 40. The device 10 may be operative to use the allocated resources, which are resources in the frequency band licensed to the cellular network, for transmission of a signal for finding RFID tags that are located in proximity to the device 10.

The receive circuit 13 may be operative to process a resource allocation message received from the base station 40. The resource allocation message may define resources in the spectrum licensed to the operator of the cellular network which may then be used by the device 10 for transmission of a signal to find RFID tags. The resource allocation message may schedule at which time and at which frequency the device 10 transmits a signal that triggers the RFID tags located in proximity to the device 10 to respond.

The device 10 has an electronic circuit 14 operative to control the transmit circuit 12 of the wireless interface 11 so as to transmit a signal at resources allocated by the base station 40 in order to trigger RFID tags located in proximity to the device 10 to transmit a tag response. The electronic circuit 14 is operative to process the resource allocation received at the wire-less interface 11 from the cellular network. The electronic circuit 14 is operative to cause transmission of a short signal to trigger the RFID tags to transmit a tag response, with the time and frequency of transmission of the short signal being determined by the resource allocation performed by the cellular network.

The wireless interface 11 may be operative to receive tag responses. The received tag responses may respectively be received in resources that are also allocated to the cellular network. The received tag responses may respectively have a frequency included in a frequency band licensed to the cellular network operator.

The electronic circuit 14 may be operative to further process tag responses that were received in response to transmission of the signal in the frequency band licensed to the cellular network operator. For illustration, the electronic circuit 14 may be operative to retrieve RFID tag coordinates from a tag response if the tag response includes RFID coordinates. The electronic circuit 14 may additionally or alternatively be operative to retrieve an identifier from a tag response and to query a database of RFID tag coordinates based on the retrieved identifier. The database may be stored locally at the device 10 or may be stored remotely, e.g. in the base station 40, a cellular network node different from the base station, or another server 54.

The device 10 may have a storage device 15 which may be a non-volatile storage. The storage device 15 may be implemented as a semiconductor storage. The storage device 15 may have stored in position information of at least some RFID tags. The position information may respectively define coordinate triplets or coordinate triplets for an RFID tag, respectively in association with an identifier for the RFID tag. The electronic circuit 14 may be operative to access the storage device 15 to identify the coordinates of RFID tags that have responded to the device 10.

The device 10 may comprise a satellite-based positioning unit 16. The device 10 may be operative such that a positioning based on communication with RFID tags in spectral resources licensed to the cellular network is performed depending on whether satellite-based positioning is available. For illustration, when the device 10 is located outdoor, satellite-based positioning may be used if the device 10 receives signals from the required number of satellites. When the device 10 is located indoor or does not receive signals from the required number of satellites, RFID tag based positioning schemes may be selectively invoked.

The device 10 may be a dedicated tag reader. The device 10 may be a mobile phone or a portable computer having tag reader functionality.

The base station 40 includes a wireless interface 41. The wireless interface 41 may be operative to provide radio access functionality. The wireless interface 41 may operate in accordance with LTE standards. The base station 40 has a control circuit 42. The control circuit 42 includes a scheduler 43 to perform scheduling. The control circuit 42 is operative to control the wireless interface 41 so as to sanction and schedule the transmission of a signal by the device 10 for finding RFID tags. The scheduler 43 may be operative to determine in which time slots the signal may be transmitted by the device 10 for finding RFID tags, using a spectral resources licensed to the cellular network.

The base station 40 may be operative to monitor a trigger event. In response to detecting the trigger event, the base station 40 may request the device 10 to transmit a signal for finding RFID tags. The base station 40 may schedule the transmission of the signal by the device 10 and may allocate spectral resources licensed to the cellular network for transmission of the signal.

Alternatively or additionally, the base station 40 may be operative to sanction the use of spectral resources licensed to the cellular network for RFID tag finding in response to receiving a request from the device 10. For illustration, in response to receiving a request for resources from the device 10, the base station 40 may generate a response that sanctions the use of the cellular network resources for RFID tag finding. The response may include scheduling information and information on the spectral resources that are to be used by the device 10 for finding RFID tags.

The base station may comprise a storage medium storing a database 44 of tag positions. The database 44 may include, for each one of the plurality of RFID tags, coordinates of the respective RFID tag in association with a tag identifier. The coordinate stored in the database 44 may be coordinate triplets or coordinate triplets that also include altitude or elevation in-formation defining the altitude at which the RFID tag is located.

The RFID tag 21 comprises an antenna 32 operative to receive a signal from the device 10 having a frequency in the frequency band licensed to the cellular network to which the base station 40 belongs. The antenna 32 may be included in a more complex wireless interface 31. The wireless interface 31 may optionally allow the RFID tag to also communicate with a cellular network, such as a CIoT, via an MTC RAN, eMTC RAN or NB-IoT RAN.

The RFID tag 21 has a circuit 33 to generate a tag response in response to receipt of the signal from the device 10 at the antenna 32. The circuit 33 may be operative to generate the tag response such that it includes a tag identifier uniquely identifying the RFID tag 21 and/or tag position information defining a doublet or triplet of coordinates at which the RFID tag 21 is located.

The RFID tag 21 may be a passive RFID tag. The circuit 33 may in this case be operative such that the tag response has the same frequency as the signal received from the device 10 at the antenna 32. The tag response may have a frequency that is also included in the frequency band licensed to the cellular network.

The RFID tag 21 may be an active RFID tag. The circuit 33 may in this case be operative such that tag response has a frequency that is different from the frequency of the signal that the device 10 uses to find the RFID tag 21. The circuit 33 may be operative such that the tag response is generated at a frequency that is included in the frequency band licensed to the cellular network.

The RFID tag 21 may have a storage device 34, which may be a small semiconductor memory or other memory. The storage device 34 may store a tag identifier are tag coordinates, for example. If the RFID tag 21 is an IoT device operative to directly communicate with an IoT cellular network, the information stored in the storage device 34 may be updated by the IoT cellular network. Updated information may be received by the RFID tag 20 at the wireless interface 31 over an NB-IoT RAN, an MTC RAN, or an eMTC RAN, for example, and may be stored in the storage device 34.

While only one device 10 and only one RFID tag 21 is illustrated in FIG. 2, it will be appreciated that a plurality of devices 10 configured as described above and a plurality of RFID tags may be deployed.

Operation of the devices according to embodiments will be described in more detail with reference to FIG. 3 to FIG. 18.

Figure 3:
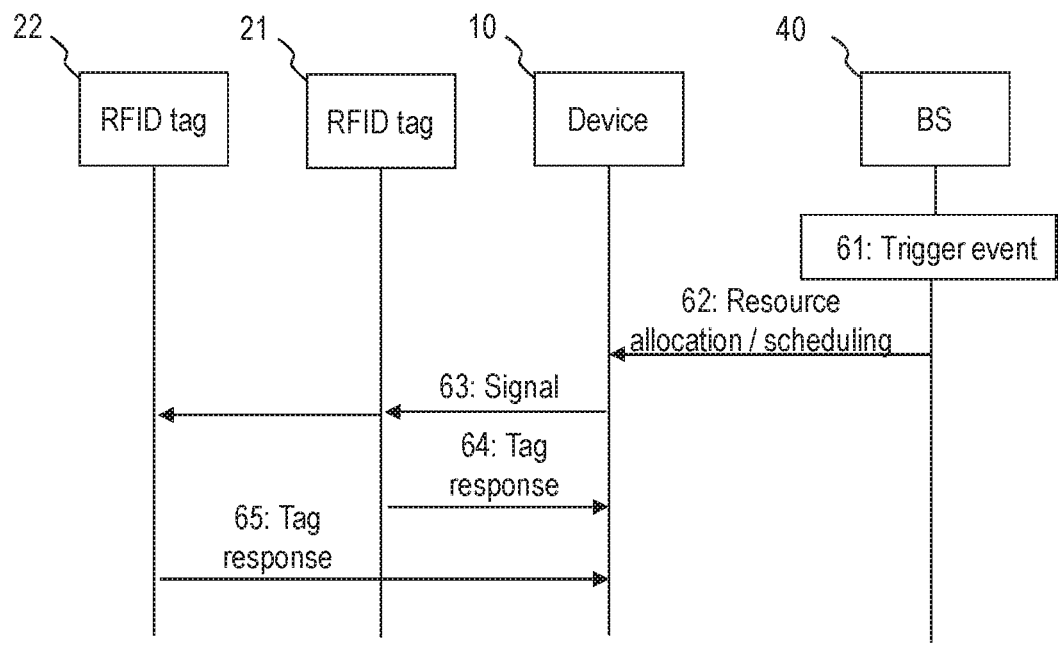
FIG. 3 is a signalling diagram illustrating the use of cellular network resources for finding RFID tags according to an embodiment.

FIG. 3 is a signalling diagram illustrating devices according to embodiments in operation. FIG. 3 illustrates a scenario in which the base station 40 monitors a trigger event to determine whether and when a device 10 is to be requested to find RFID tags located in proximity to the device 10. As illustrated in FIG. 3, the base station 40 may initiate the pinging of RFID tags by the device 10.

At 61, the base station detects a trigger event. The trigger event may be expiry of a timer. The trigger event may additionally or alternatively be dependent on position information received from the device 10. The trigger event may additionally or alternatively be dependent on cellular network conditions.

At 62, in response to detecting the trigger event, the base station 40 sanctions use of cellular network resources by the device 10 for finding RFID tags located in proximity to the device 10. The base station 40 may perform a resource allocation and may provide resource allocation information to the device 10. The base station 40 may schedule transmission of a signal by the device 10, which signal is used by the device 10 to find RFID tags 21, 22 located in proximity to the device 10.

The device 10 receives the resource allocation 62. The device 10 generates a signal 63 to find RFID tags 21, 22 located in proximity to the device 10. The signal 63 is generated in accordance with the resource allocation received from the cellular network. The signal 63 may be generated at a time and in a spectral resource, i.e. a frequency, that is defined by the resource allocation 62. The signal 63 may be generated in a spectral resource, i.e. a frequency, which is licensed to the cellular network operator of the base station 40.

The RFID tag 21 transmits a tag response 64 in response to receipt of the signal 63. The tag response 64 may include coordinates of the RFID tag 21 or another unique tag identifier for the RFID tag 21. The coordinates may include a height coordinate of the RFID tag 21. The tag response 64 may be transmitted in a spectral resource, i.e. a frequency, which is licensed to the cellular network operator of the base station 40. If the RFID tag 21 is a passive RFID tag, the tag response 64 may be transmitted at the same frequency at which the RFID tag 21 receives the signal 63. If the RFID tag 21 is an active RFID tag, the tag response 64 may be transmitted at a different frequency than the one at which the RFID tag 21 receives the signal 63.

The RFID tag 22 transmits a tag response 65 in response to receipt of the signal 63. The tag response 65 may include coordinates of the RFID tag 22 or another unique tag identifier for the RFID tag 22. The coordinates may include a height coordinate of the RFID tag 22. The tag response 65 may be transmitted in a spectral resource, i.e. a frequency, which is licensed to the cellular network operator of the base station 40. If the RFID tag 22 is a passive RFID tag, the tag response 65 may be transmitted at the same frequency at which the RFID tag 22 receives the signal 63. If the RFID tag 22 is an active RFID tag, the tag response 65 may be transmitted at a different frequency than the one at which the RFID tag 22 receives the signal 63.

The device 10 may process the tag response 64, 65 received in response transmission of the signal 63. It will be appreciated that, while two tag responses are exemplarily shown in FIG. 3, other numbers of tag responses may be received. For illustration, the device 10 may receive none, one, two, three or more than three tag responses. The device 10 may process the tag responses received in dependence on the further positioning or object tracking is to be performed. For illustration, in order to determine the position of the device 10, the device 10 may process the tag responses received from two, three, or more than three RFID tags. The device 10 may retrieve information on RFID tag coordinates from a local memory, from a database in the base station 40, or from another local a distributed server.

The device 10 may process the tag responses 64, 65 differently depending on whether tag responses originate from close-by or more distant RFID tags or based on other criteria. For illustration, positioning may be implemented in such a manner that close-by RFID tags are prioritized over RFID tags that are further away. Signal level or time of arrival may be indicative of the distance between the respective RFID tag and the device 10 and may be taken into account when determining which RFID tag responses are processed further for position determination. In some embodiments, passive RFID tags may be prioritized over active RFID tags for position determination, e.g., if a density of passive tags is higher than a density of active tags so that better accuracy is attainable on average for positioning that prefers tag responses from passive RFID tags over tag responses from active RFID tags.

Additionally or alternatively to the base station 40 initiating the pinging for RFID tags, the allocation of resources licensed to the cellular network for transmission of the signal by the device 10 for finding RFID tags may be triggered by detection of an emergency situation, e.g. when an emergency number is dialed.

Figure 4:
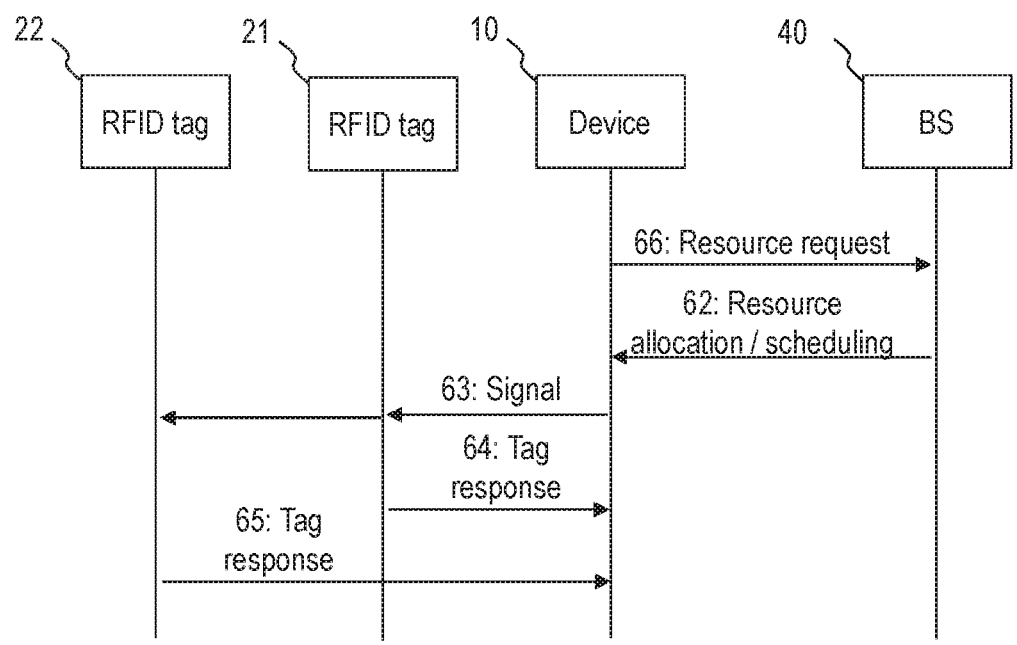
FIG. 4 is a signalling diagram illustrating the use of cellular network resources for finding RFID tags according to an embodiment.

FIG. 4 is a signalling diagram illustrating devices according to embodiments in operation. FIG. 4 illustrates a scenario in which the device requests the base station 40 to allocated resources and schedule transmission of the signal 63, which the device 10 transmits to find RFID tags located in proximity to the device 10.

At 66, the device 10 transmits the resource allocation request. The resource allocation re-quest may indicate to the base station that the device 10 intends to search for RFID tags using spectral resources licensed to the cellular network. The resource allocation request may include at least one indicator bit that indicates that we are located spectral resources are to be used for communication between the device 10 and at least one RFID tag 21, 22.

At 62, the base station performs a resource allocation. The allocated resources in the spectral range licensed to the cellular network may be subsequently used by the device 10 to find RFID tags 21, 22 using the techniques described with reference to FIG. 3 above. In particular, a signal 63 may be transmitted by the device 10 in order to trigger the RFID tags 21, 22 to respond thereto. The signal 63 may have a frequency in the spectral range licensed to the cellular network. Tag responses 64, 65 may be received by the device 10 from the RFID tags 21, 22 located in proximity to the device 10. The tag responses 64, 65 may each have a frequency in the spectral range licensed to the cellular network. The tag responses 64, 65 may be processed further by the device 10. Positioning our object tracking may be performed, as will be described in more detail below.

Figure 5:
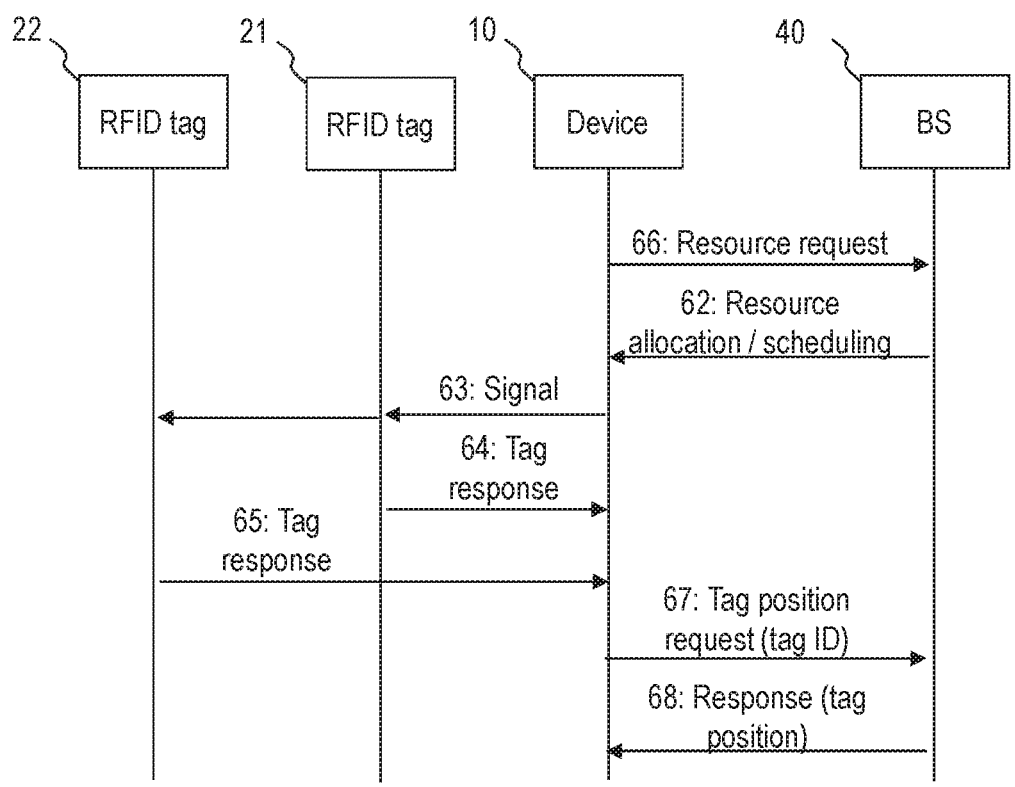
FIG. 5 is a signalling diagram illustrating the use of cellular network resources for finding RFID tags according to an embodiment.

FIG. 5 is a signalling diagram illustrating devices according to embodiments in operation. FIG. 5 illustrates a scenario in which the device requests the base station 40 to allocated resources which the device 10 uses to find RFID tags located in proximity to the device 10. In FIG. 5, the processing of the tag responses 64, 65 includes querying for positions of the RFID tags from which the tag responses 64, 65 have been received.

The resource allocation 62 may be triggered by the detection of a trigger event at the base station 40 or by the resource allocation request 66. The use of the allocated resources may be implemented as described with reference to FIG. 3 and FIG. 4 above.

In response to receiving the tag responses 64, 65, the device 10 may retrieve an identifier from each tag response 64, 65. The device 10 may generate a tag position request 67 including the identifier for at least one of the RFID tags from which a tag response was received. The tag position request 67 may be transmitted to the base station 40 and may be processed locally at the base station 40, at another cellular network node, or at another local or distributed server.

The device 10 may receive a response 68 carrying tag position information in response to the tag position request 67. The tag position information may comprise coordinate duplets or coordinate triplets that define lateral coordinates and, optionally, a height coordinate of the respective RFID tag.

The device 10 may process the tag position information to determine the location of the de-vice 10. For illustration, triangulation or other techniques may be used by the device 10 to determine its position from the positions of their RFID tags that responded to the signal 63. Distances between the device 10 and each RFID tag 21, 22 that transmitted a tag response may be determined by time delay measurements and/or from signal levels.

The tag response received from an active RFID tag may respectively include timing information. The timing information may be used by the device 10 to determine the distance between the device 10 and the respective RFID tag.

Figure 6:
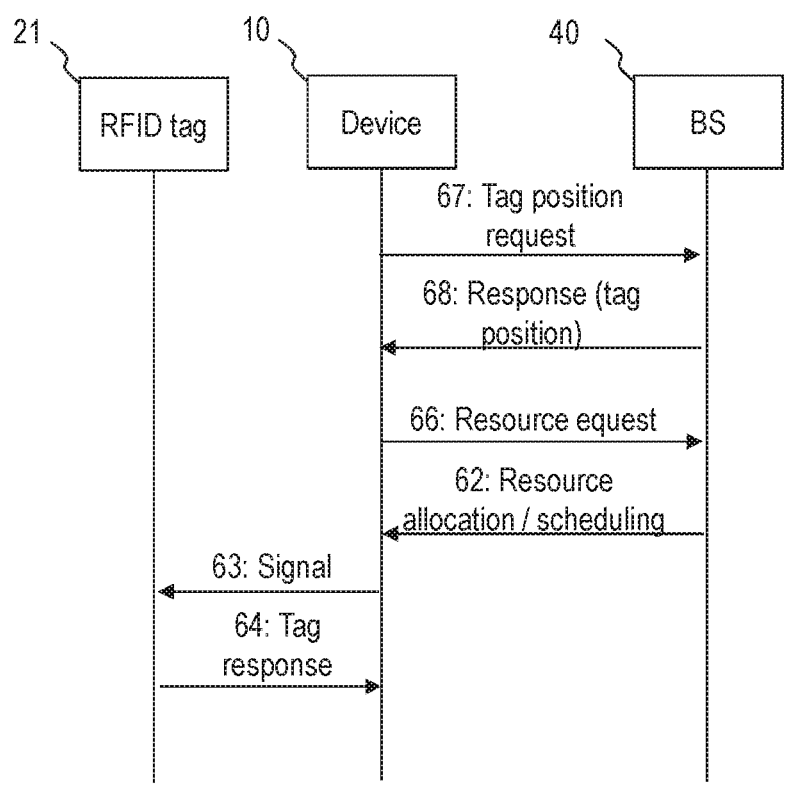
FIG. 6 is a signalling diagram illustrating the use of cellular network resources for finding RFID tags according to an embodiment.

FIG. 6 is a signalling diagram illustrating devices according to embodiments in operation. FIG. 6 illustrates a scenario in which the device 10 is used for tracking RFID tags. The RFID tags that are being tracked may be tags that are attached to articles of purchase, such as goods on sale, or tags attached to moving living beings, such as animals.

The device 10 may transmit a tag position request 67 to request information on the last known position of an RFID tag 21. The tag position request 67 may be transmitted to the base station 40 and may be processed locally at the base station 40, at another cellular network node, or at another local or distributed server.

The device 10 may receive a response 68 carrying tag position information that indicates the last known position of the respective RFID tag 21. The tag position information may comprise coordinate duplets or coordinate triplets that define lateral coordinates and, optionally, a height coordinate of the respective RFID tag.

When the device 10 is located in proximity to the last known position of the RFID tag indicated in the response 68, the device 10 may request resources by transmission of the resource allocation request 66. The resource allocation 62 may cause the device 10 to transmit the signal 63 using resources licensed to a cellular network operator. The tag response 64 may be evaluated to verify that the tag response 64 originated from the desired RFID tag 21 that is to be tracked.

Figure 7:
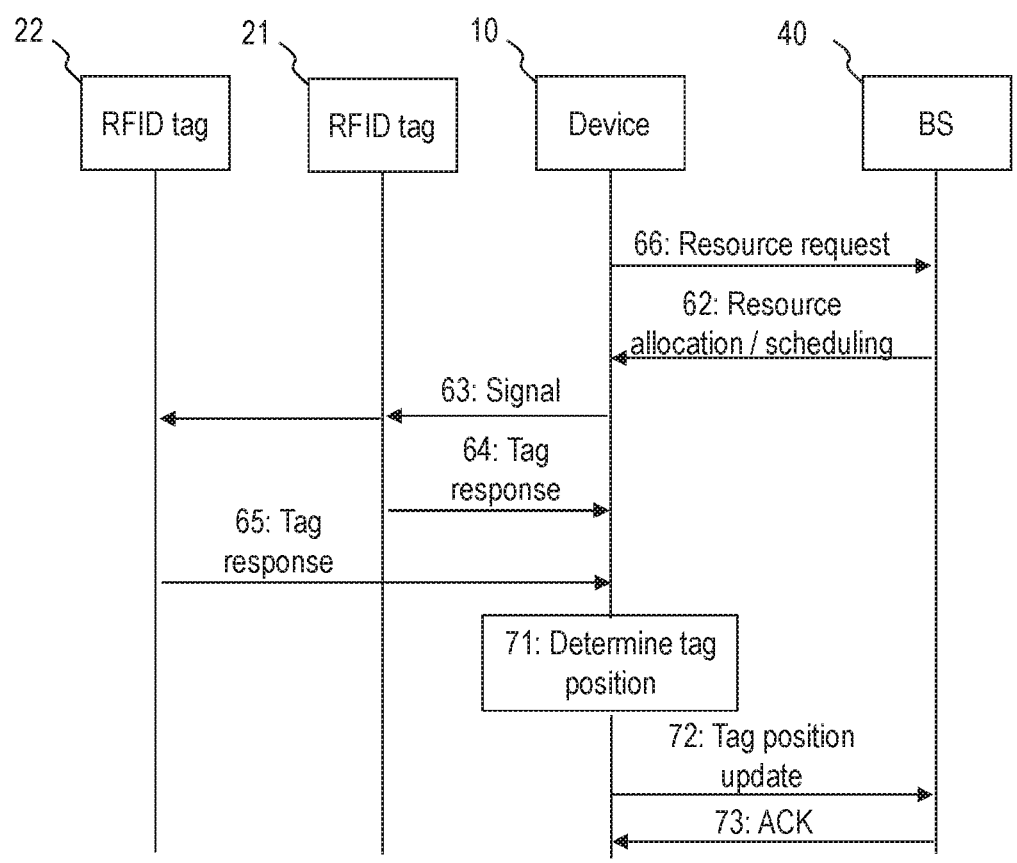
FIG. 7 is a signalling diagram illustrating the use of cellular network resources for finding RFID tags according to an embodiment.

FIG. 7 is a signalling diagram illustrating devices according to embodiments in operation. FIG. 7 illustrates a scenario in which the device 10 is used for tracking RFID tags. The RFID tags that are being tracked may be tags that are attached to articles of purchase, such as goods in a store, or tags attached to moving living beings, such as animals.

The device 10 may request the allocation of resources for finding RFID tags by transmission of the resource allocation request 66. In response to receiving the resource allocation 62, the device 10 may use the allocated resources for finding RFID tags 21, 22 positioned in proximity to the device 10. The respective signal transmission, at spectral resources licensed to the cellular network.

At 71, the device 10 may determine the positions of the RFID tags 21, 22 that responded to the signal 63. To this end, the device 10 may for example determine its own position based on the tag responses received from other, stationary RFID tags. The position of the device 10, optionally in combination with information on distance between the device 10 and the RFID tags 21, 22, may be used to determine the estimates for the tag positions of the RFID tags 21, 22.

At 72, the device 10 may transmit a tag position update 72 to the base station 40. The tag position update may include information on the currently determined tag position for the RFID tags 21, 22 that responded to the signal 63. The tag position update 72 may be used in the base station 40, by another cellular network node, or by a local or distributed server that maintains position information for RFID tags to update the respectively stored tag positions. Receipt of the tag position update 72 may be acknowledged at 73.

Figure 8:
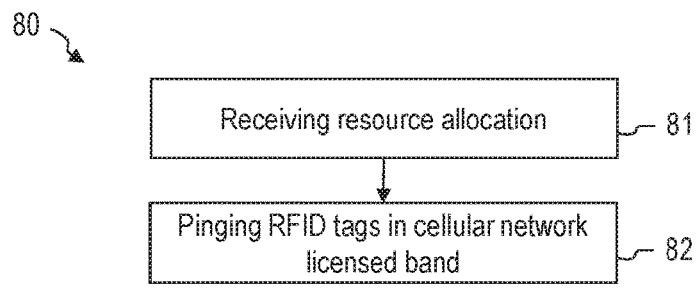
FIG. 8 is a flowchart of a method performed by a device according to an embodiment.

FIG. 8 is a flowchart of a method 80 according to an embodiment. The method 80 may be performed by a device 10 according to an embodiment. The device 10 may be a mobile terminal of a cellular network.

At 81, the device 10 may receive a resource allocation from the cellular network. The re-source allocation may identify a spectral resource and a timeslot in which the device 10 may transmit a signal to find RFID tags located in proximity to the device 10.

At 82, the device 10 may ping RFID tags by transmission of a signal that is generated in accordance with the allocated resources. The signal may have a frequency included in a frequency band licensed to the cellular network.

In any one of the various embodiments, RFID tag based positioning schemes may be invoked selectively depending on whether another positioning unit, such as a satellite based positioning unit, is operative. This is illustrated in FIG. 9.

Figure 9:
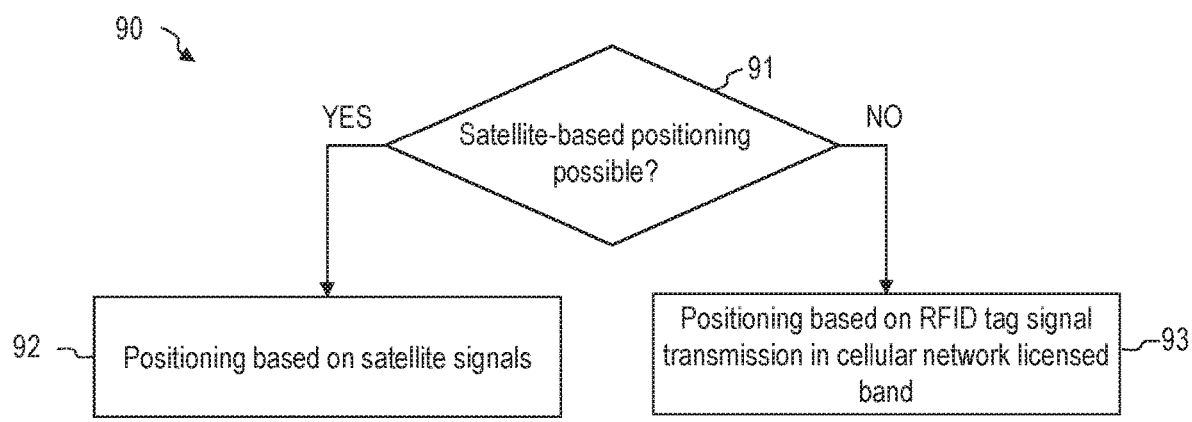
FIG. 9 is a flowchart of a method performed by a device according to an embodiment.

FIG. 9 is a flowchart of a method 90 according to an embodiment. The method 90 may be performed by device 10 according to an embodiment.

At 91, the device 10 may determine whether satellite based positioning, e.g. based on the GPS signals or Galileo satellite signals, is available. To this end, the device 10 may determine whether a sufficient number of signals from different satellites is received. If this is not the case, e.g. because the device 10 is located indoor or because the line of sight to too many satellites is blocked otherwise, the method proceeds to step 93 to perform the positioning by finding RFID tags located in proximity to the device 10.

At 92, the device 10 performs a positioning based on satellite signals if a sufficiently large number of satellite signals is available.

At 93, the device 10 finds RFID tags located in proximity to the device 10 using any one of the various techniques described with reference to FIG. 1 to FIG. 8 above. In particular, the device 10 may request the base station 40 to sanction the use of cellular network resources for finding RFID tags. The base station 40 may perform scheduling and may sanction the use of cellular network spectral resources for transmission of a short signal that triggers responses from RFID tags.

Figure 10:
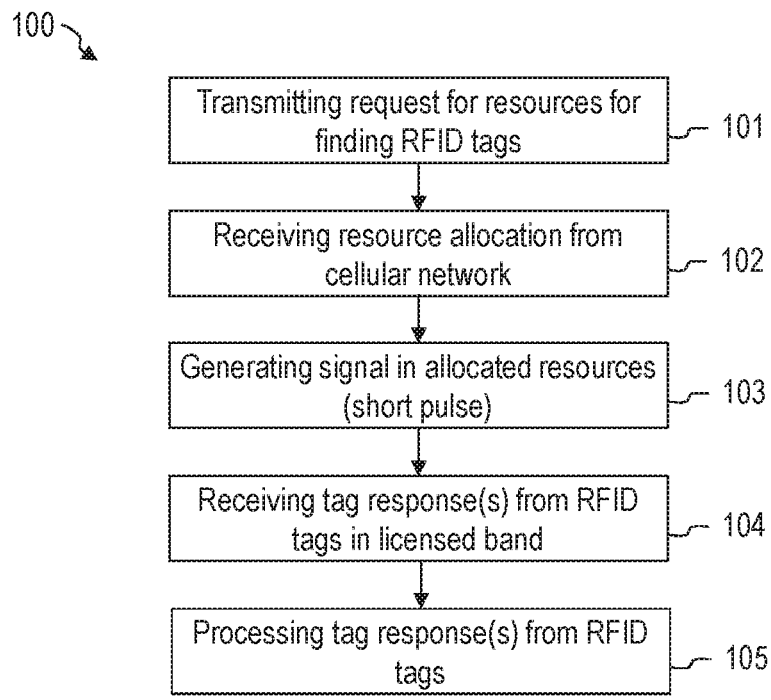
FIG. 10 is a flowchart of a method performed by a device according to an embodiment.

FIG. 10 is a flowchart of a method 100 according to an embodiment. The method 100 may be performed by the device 10 according to an embodiment.

At 101, the device 10 may transmit a request for resources to the cellular network to request a location of resources for finding RFID tags. The request may be transmitted to the base station 40 of the cellular network.

At 102, the device 10 may receive a resource allocation from the cellular network. The re-source allocation may indicate resources in the time frequency resource grid which are to be used by the device 10 to find RFID tags located in proximity to the device 10.

At 103, the device 10 may generate a signal in accordance with the allocated resource. The signal may trigger RFID tags located in proximity to the device 10 to respond to the signal. The signal may be an operator locked, short pulse. The signal may be generated such that it has a frequency in a frequency band licensed to the cellular network that sanctions the use of the resources.

At 104, the device 10 may receive tag responses from RFID tags. The tag responses may respectively have a frequency in the frequency band licensed to a cellular network that sanctions the use of the resources.

At 105, the device 10 processes the tag responses. Processing the tag responses may include retrieving tag identifiers from received tag responses. Processing the tag responses may include querying for tag positions using the tag identifiers.

When the device 10 only moves in a small area, the required tag positions may be stored locally at the device 10. If the device 10 may require position information of a large number of RFID tags, the device 10 may interact with external entities, such as the base station 40, another cellular network node, or another local or distributed server 54, that maintains a database of tag positions. This will be explained in more detail with reference to FIG. 11.

Figure 11:
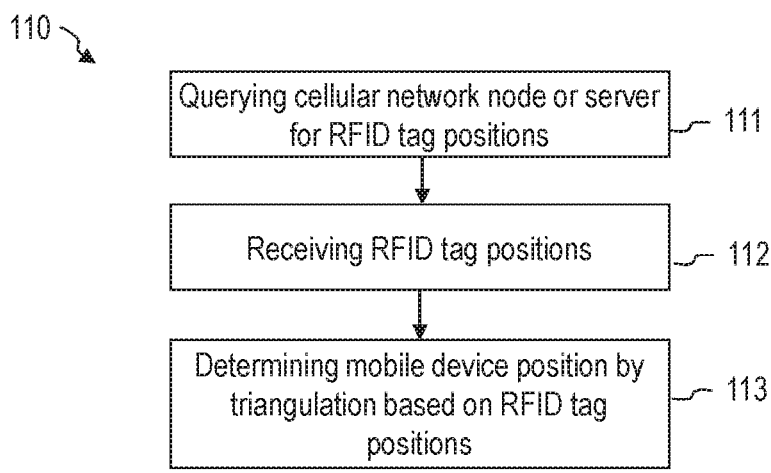
FIG. 11 is a flowchart of a method performed by a device according to an embodiment.

FIG. 11 is a flowchart of a method 110 according to an embodiment. The method 110 may be performed by the device 10 according to an embodiment. The method 110 may be per-formed to implement the processing of the tag responses at step 105 in the method of FIG. 10.

At 111, the device 10 may query a cellular network node, such as the base station, or a server for tag positions. A query transmitted to the cellular network node or the server may include a tag identifier retrieved from a tag response that was previously received.

At 112, the device 10 may receive the tag position information for the respective RFID tags. The tag position information may be transmitted over the radio access network of the cellular network. The tag position information may include triplets or duplets of coordinates that define the tag positions.

At 113, the device 10 may process the received tag position information to determine the position of the device 10. Distances between the device 10 and the respective RFID tags, which may be established from time delays or from signal levels of the tag responses, may also be taken into account to determine the position of the device 10.

In any one of the various embodiments, the device 10 may perform different processing steps in dependence on the number of active and passive RFID tags from which the tag response has been received. An exemplary implementation of such a scheme will be explained in more detail with reference to FIG. 12.

Figure 12:
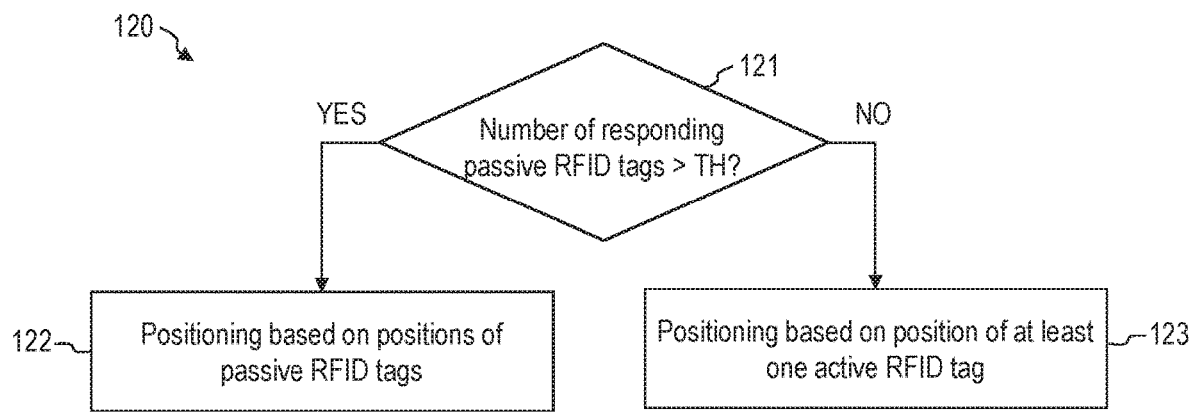
FIG. 12 is a flowchart of a method performed by a device according to an embodiment.

FIG. 12 is a flowchart of a method 120 according to an embodiment. The method 120 may be performed by the device 10 according to an embodiment. The method 120 may be per-formed to implement the step 105 in the method of FIG. 10.

At 121, it is determined whether the number of RFID tags that are passive RFID tags and from which a tag response has been received in response transmission of a signal exceeds a threshold. In order to perform the determination at step 121, active and passive RFID tags may be discriminated based on the frequencies at which their respective tag responses are received by the device 10.

At 122, if the number of passive RFID tags from which a tag response was received exceeds the threshold, the position of the device 10 may be determined based on the positions of these passive RFID tags only. Positions of active RFID tags that have also responded may, but do not need to be taken into account.

At 123, if the number of passive RFID tags from which a tag response was received is equal to the threshold or less than the threshold, the position of the device 10 may be determined based on the position of any passive RFID tag from which a tag response was received and, additionally, based on the positions of one or several active RFID tags from which a tag response has been received.

The threshold may be set to be equal to two. I.e., the positioning may be performed based on tag responses received from passive RFID tags if at least three passive RFID tags provided a tag response. The threshold may be set to be equal to three. I.e., the positioning may be performed based on tag responses received from passive RFID tags if more than three passive RFID tags provided a tag response.

Alternatively or additionally to a prioritization based on whether an RFID tag is an active or passive RFID tag, other processing techniques may be used. For illustration, close-by RFID tags may be weighted more strongly than more distant RFID tags when determining the de-vice position. The distance may respectively be established based on signal level or time of arrival delays. In still further embodiments, all received tag responses may be taken into account for position determination.

In any one of the embodiments, determining the position of the device 10 based on positions of RFID tags that are located in proximity to the device 10 may be repeated. If the device 10 is a mobile device, a velocity profile of the device 10 including three-dimensional velocity information may be determined. To this end, position differences between successive the determined device positions may be computed based on the tag responses received in a time sequential manner. This will be explained in more detail with reference to FIG. 13.

Figure 13:
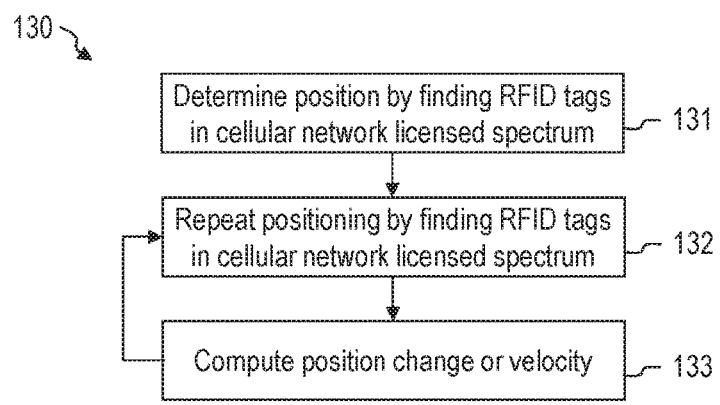
FIG. 13 is a flowchart of a method performed by a device according to an embodiment.

FIG. 13 is a flowchart of a method 130 according to an embodiment. The method 130 may be performed by the device 10 according to an embodiment.

At 131, the position of the device 10 may be determined by finding RFID tags that are located in proximity to the device 10 and by processing their respective positions. The signal that is transmitted by the device 10 to find the RFID tags may be transmitted in spectral resources licensed to the cellular network operator, as described above. Resource allocation may be performed by the cellular network. The cellular network may sanction the use of spectral resources licensed to the cellular network and may schedule the transmission of the signal by the device 10 to find RFID tags.

At 132, the determination of the position of the device 10 may be repeated. Step 132 may be implemented in the same way as step 131. In particular, the RFID tags may be found by transmission of a signal that is also transmitted in accordance with a resource allocation performed by the cellular network.

Steps 131 and 132 may respectively be performed in accordance with any one of the schemes explained with reference to FIG. 1 to FIG. 12 above.

At 133, the position change or velocity of the device 10 is computed. Computing the position change or velocity may include computing three coordinates of the position change or three coordinates of the velocity, including a height coordinate that indicates the position change or velocity parallel to the gravity vector.

Steps 132 and 133 may be repeated to determine a time dependent velocity profile of the device 10.

The device 10 according to an embodiment, be it a stationary or mobile device, may not only be operative to determine its own position based on tag responses received from RFID tags, but may also be used for other scenarios such as RFID tag tracking. A method according to an embodiment in which the device 10 is operative for RFID tag tracking will be explained with reference to FIG. 14.

Figure 14:
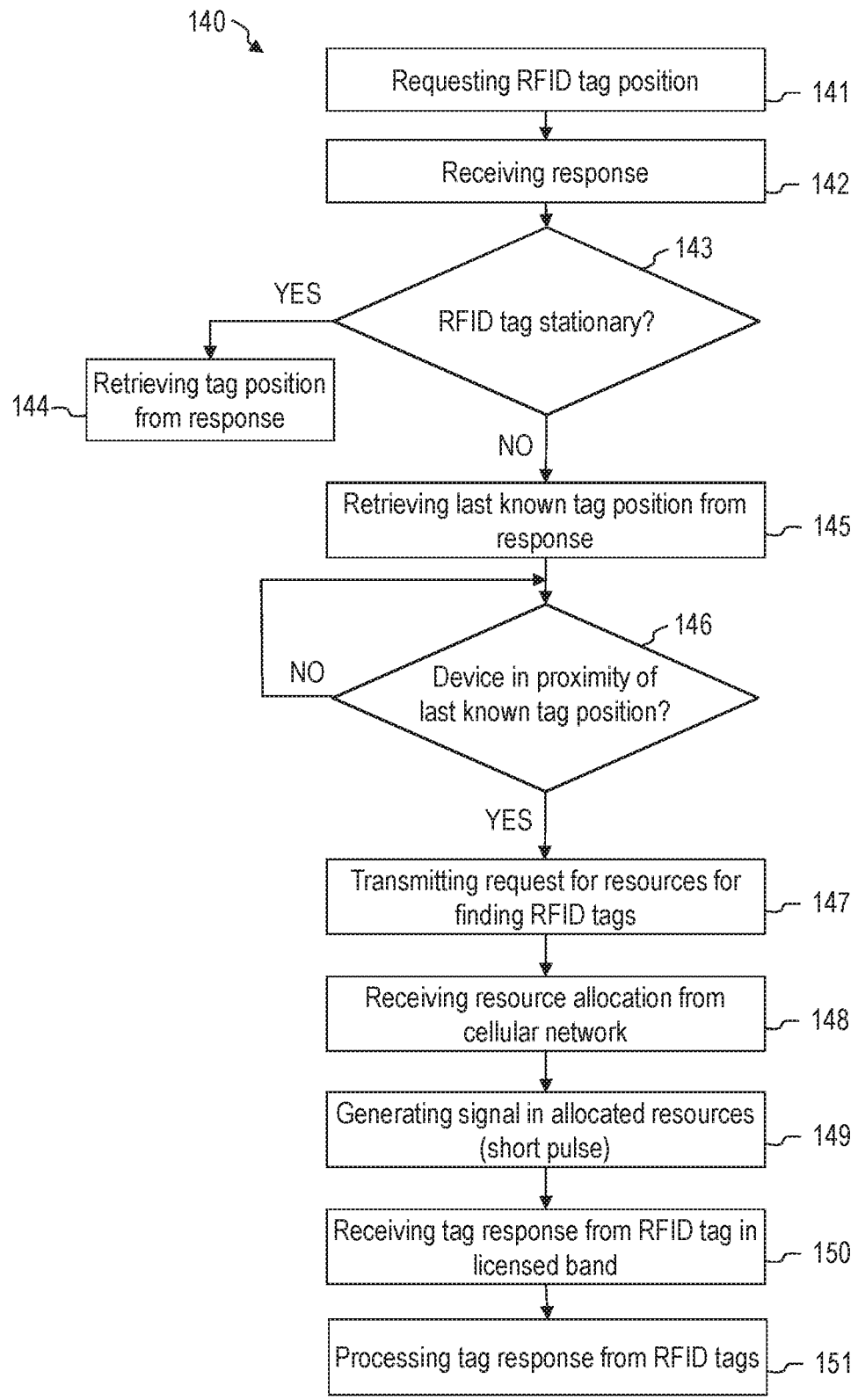
FIG. 14 is a flowchart of a method performed by a device according to an embodiment.

FIG. 14 is a flowchart of a method 140 according to an embodiment. The method 140 may be performed by the device 10 according to an embodiment. The method 140 may be per-formed when the device 10 determines autonomously that the position of an RFID tag is to be tracked or when the cellular network request the device 10 to track an RFID tag.

At 141, the device 10 requests information on a position of an RFID tag are of plural RFID tags. Requesting the position information may include transmitting a position request message to the base station 40. The position information that is requested by the device 10 may indicate the stationary position of a stationary RFID tag or the last known position of a mobile RFID tag. This information may be stored in a database in the base station 40, in another cellular network node, or in a server 54 that is separate from the cellular network.

At 142, the device 10 receives a response to the position information request. The response includes the stationary position of the stationary RFID tag or the last known position of a mobile RFID tag, depending on with the RFID tag specified in the request transmitted at 141 is stationary or mobile. The response received that 142 may include an indicator of whether the RFID tag is stationary or mobile. The indicator may be one or several indicator bits included in the response received at 142.

At 143, the device 10 may determine whether the RFID tag that is to be tracked is stationary. The device 10 may evaluate at least one indicator bit included in the response received at 142 to determine whether the RFID tag is stationary. The device 10 may evaluate locally stored information to determine whether the RFID tag is stationary. If the RFID tag is stationary, the device 10 may retrieve the tag position from the response received at 142 in step 144. Otherwise, the method continues at 145.

At 145, if the RFID tag that is to be tracked is mobile, the device 10 retrieves the last known tag position of the RFID tag from the response received at 142.

At 146, the device 10 determines that a tag is located in proximity to the last known tag position of the RFID tag. The determining at 146 may include comparing the distance between the current device position of the device 10 and the last known position of the RFID tag to a threshold. The threshold may correspond to a range over which the device 10 can find RFID tags. This range may be from 1 m to 12 m for a passive RFID tag. This range may be from 100 m to 1 km for an active RFID tag. If the distance between the device 10 and the RFID tag is not less than the threshold, the monitoring at 146 is continued.

At 147, if the device 10 is located sufficiently close to the last known position of the RFID tag that the device 10 can ping the RFID tag, the device 10 requests resources for finding RFID tags from the cellular network.

At 148, the device 10 receives a resource allocation from the cellular network. The cellular network may schedule the transmission of a signal by the device 10 that is transmitted to find RFID tags. The cellular network may determine at which frequency licensed to the cellular network operator the device 10 is to transmit the signal.

At 149, the device 10 generates the signal in accordance with the resource allocation per-formed by the cellular network. The signal may be assured operator locked pulse.

At 150, the device receives tag responses from RFID tags. The tag responses may each have a frequency in a spectral band licensed to the cellular network operator.

At 151, the device 10 may process the received tag responses. The device 10 may deter-mine whether the RFID tag that is to be tracked has responded. The device 10 may determine a distance between the device 10 and the RFID tag that is to be tracked based on a signal level of the received tag response or based on a time delay between transmission of the signal by the device 10 and receipt of the tag response.

The device 10 may optionally provide a position update indicating a new tag position of the contract RFID tag. The position update may be included in a message transmitted to the cellular network.

For enhanced flexibility and versatility of the RFID tags that are deployed for interaction with terminals of the cellular network, at least some of the RFID tags may be operative to communicate with an Internet of Things (IoT) cellular network. To this end, the wireless interface of the RFID tag may be operative to communicate with a Cellular IoT (CIoT) CN over an MTC RAN, an eMTC RAN or a NB-IoT RAN. This is illustrated in FIG. 15.

Figure 15:
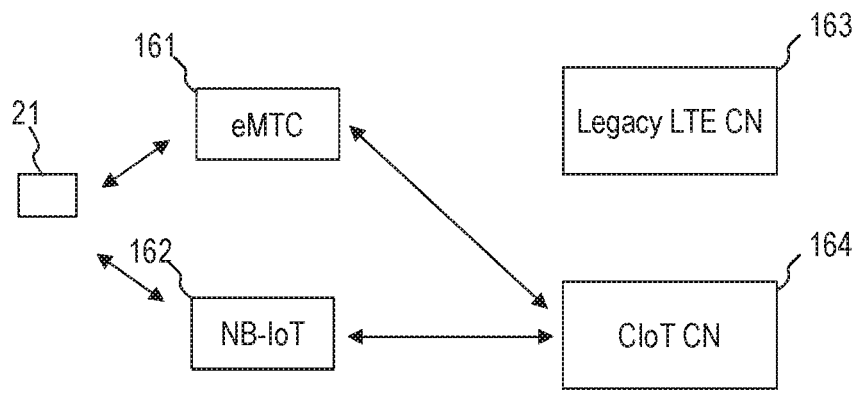
FIG. 15 illustrates the updating of an RFID tag via an eMTC or NB-IoT radio access network.

FIG. 15 illustrates an RFID tag 21 having a wireless interface. The RFID tag 21 is operative to be pinged by device 10 in a spectral range that is licensed to the cellular network operator. The wireless interface of the RFID tag 21 may be operative to communicate with the CIoT CN 164 over either one or both of the eMTC RAN 161 or NB-IoT RAN 162. The RFID tag 21 may be configured such that it cannot communicate with a legacy LTE core network 163.

In operation, the RFID tag 21 may be updated via the IoT cellular network. Updating the RFID tag 21 may include receiving, by the RFID tag 21, updating information from the IoT cellular network. The updating information may be stored by the RFID tag 21 in a non-volatile memory. The updating information may be used by the RFID tag 21 when generating the tag response.

The RFID tag 21 that is operative to be updated by the IoT cellular network may be a stationary or even mobile active RFID tag.

Figure 16:
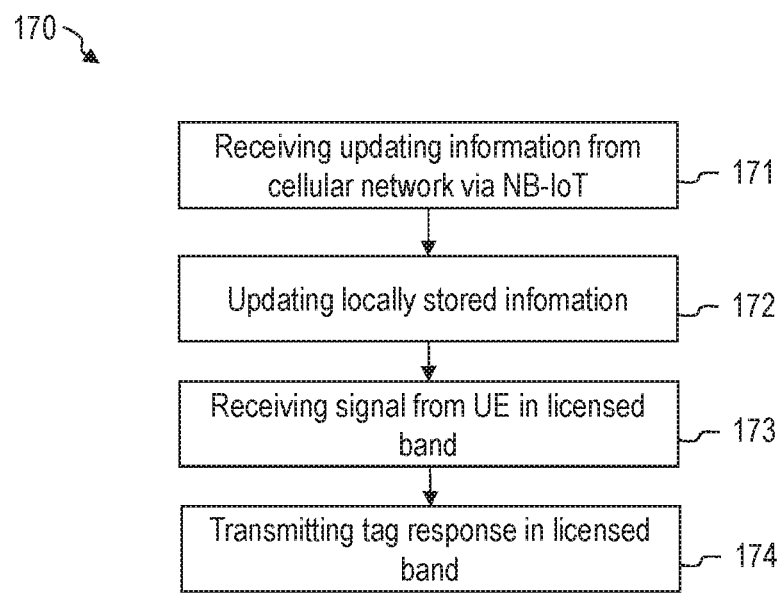
FIG. 16 is a flowchart of a method performed by an RFID tag according to an embodiment.

FIG. 16 is a flowchart of a method 170 according to an embodiment. The method 170 may be performed by an active RFID tag that is operative to communicate with a cellular IoT net-work.

At 171, the RFID tag receives updating information from the cellular IoT network via a NB-IoT RAN, an MTC RAN, or an eMTC RAN.

At 172, locally stored information in the RFID tag is updated based on the received updating information.

At 173, when a device 10 attempts to find RFID tags located in proximity to the device 10, the RFID tag receives a signal from the device 10 in a band licensed to a cellular network.

At 174, in response to receiving a signal from the device 10, the RFID tag generates a tag response having a frequency in spectral resources licensed to the cellular network operator. The tag response may be generated in dependence on the updated data stored locally at the RFID tag.

Figure 17:
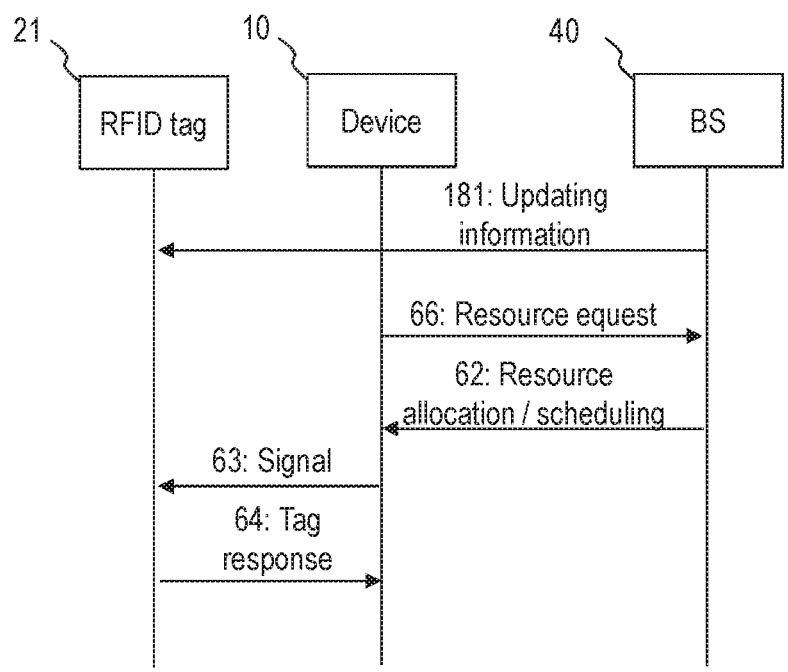
FIG. 17 is a signalling diagram illustrating the use of cellular network resources for finding RFID tags according to an embodiment.

FIG. 17 is a signalling diagram that illustrates the updat-ing of information in the RFID tag 21 is operative to communicate with the IoT cellular network.

The RFID tag 21 may receive updating information 181 directly from the base station 40 acting as node of the NB-IoT, MTC, or eMTC RAN.

The finding of the RFID tag 21 by the device 10 may subsequently be performed in accordance with any one of the various techniques described with reference to FIG. 1 to FIG. 16.

Figure 18:
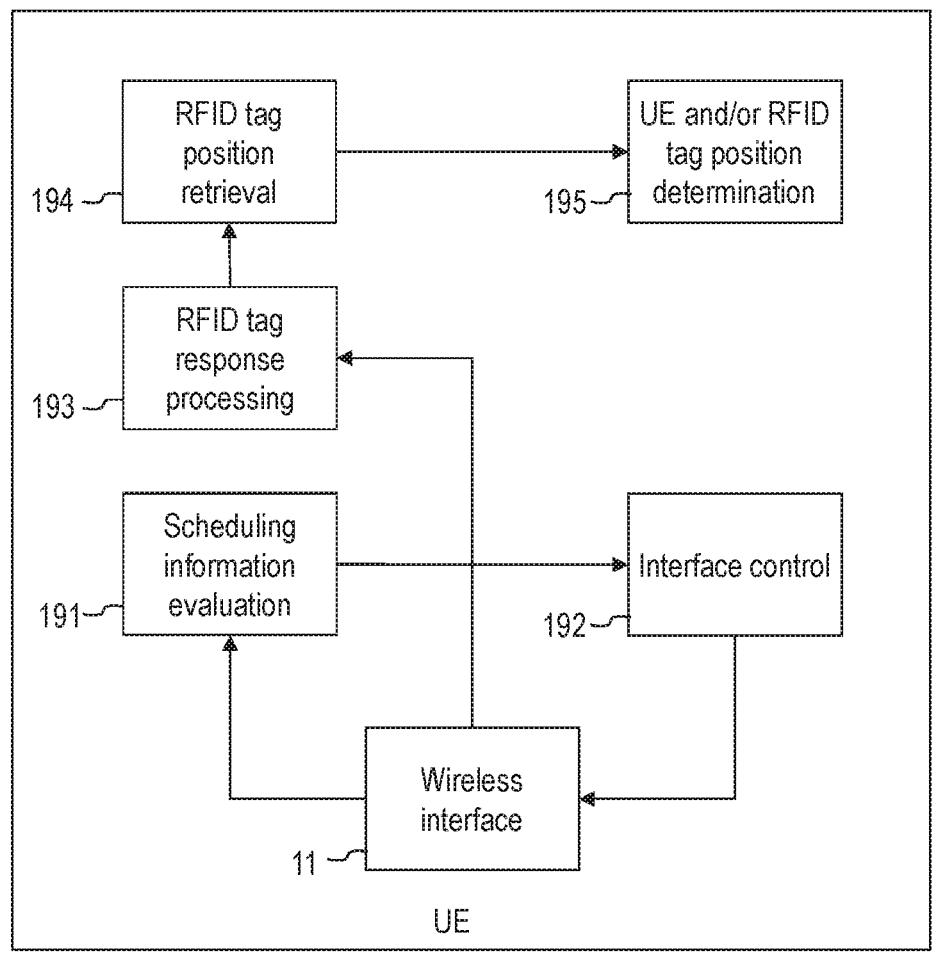
FIG. 18 is a functional block diagram of a mobile device according to an embodiment.

FIG. 18 is a functional block diagram of a device 10 operative to find RFID tags using spectral resources licensed to a cellular network operator. The device 10 may be a terminal of the cellular network. The device 10 may be a UE.

The device 10 has a wireless interface 11 which may be operative for communication over the LTE RAN or accor-dance with another cellular communication standard.

The device 10 has a scheduling information evaluation module 191 operative to process scheduling information received at the wireless interface 11 from the cellular net-work. The cellular network may schedule the transmission of signals by the device 10 for finding RFID tags. The scheduling information evaluation module 191 may control an interface control module 192 to indicate at which times and in which spectral resource, i.e. frequency, the signal for tag finding is to be transmitted.

The device 10 may have an RFID tag response processing module 193. The RFID tag response processing module 193 may be operative to process tag responses received from RFID tags in response to transmission of the signal.

The device 10 may have a tag position retrieval module 194. The tag position retrieval module 194 may be operative to identify tag positions of RFID tags that responded to the signal. The tag position retrieval module 194 may be opera-tive to retrieve coordinate duplets or co-ordinate triplets of those RFID tags from the received tag responses. The tag position retrieval module 194 may be operative to initiate querying of a data base for the tag positions. Querying of the database may include transmission of a position query over the wireless interface 11. Querying of the database may include processing a response to a position query received at the wireless interface 11. The response may carry position information for one or several RFID tags retrieved from a database that may be maintained at the base station 40, at another cellular network node, or at a server 54 separate from the cellular network.

The device 10 may have a position determination module 195. The position determination module 195 may be opera-tive to determine the position of the device 10. The position determination module 195 may be operative to perform a triangulation to determine the position of the device 10 based on the tag positions and, optionally, information on distances between the device 10 and the RFID tags.

In any one of the signalling flows, methods, devices and systems described above, the base station 40 may also schedule the transmission of the tag response(s) by the RFID tags. This may be done such that the resource for transmis-sion of the tag response is allocated dynamically, or that the tag response is always transmitted with a fixed, pre-deter-mined time and/or frequency offset relative to the signal which is transmitted by the device 10 for tag finding.

In any one of the signalling flows, methods, devices and systems described above, the base station 40 may schedule recurring time slots, e.g. periodically recurring time slots, for the transmission of the signal by the device 10 for tag finding. Several different user equipments may transmit their signal for tag finding in these time slots, to mitigate inter-ference with data transmissions between the cellular net-work and the user equipments.

Various effects are attained by the devices, methods and systems according to embodiments. For illustration, user equipments are other RFID tag readers may be operative to find RFID tags using spectral resources licensed to a cellular network operator. This enables the cellular network operator to offer additional services such as indoor positioning for user equipments such as handsets or RFID tag tracking.

While exemplary embodiments have been described with reference to the drawings, modifications may be implemented in other embodiments. For illustration, while embodiments have been described in the context of exemplary radio access networks and core networks, the techniques discussed herein are applicable to a wide variety of other cellular networks. For further illustration, while exemplary signalling flows have been illustrated in detail, the re-source allocation for tag finding may be implemented using alternative signalling flows.

While the device 10 that is operative to find RFID tags located in proximity to the device 10 may be a handset, the techniques discussed herein may also be used in conjunction with other devices 10 such as dedicated tag readers.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

What is claimed is:

1. A method of communicating between a mobile communication device and at least one RFID tag, comprising:
   transmitting, by the device, a resource allocation request to a cellular network to request an allocation of wireless spectrum resources with which to transmit a signal to find the at least one RFID tag, the resources being allocated by the cellular network and the at least one RFID tag being stationary;
   receiving, by the device, an allocation of wireless spectrum resources for transmission of the signal to find the at least one RFID tag;
   transmitting, by the device, the signal to find the at least one RFID tag using the wireless spectrum resources allocated by the cellular network, the signal having a frequency in a frequency band licensed to the cellular network;
   receiving, by the device, a tag response from the at least one RFID tag in response to the signal transmitted by the device, the tag response being received in the wireless spectrum resources allocated by the cellular network; and
   determining a position based on the tag response, including determining a tag position of the at least one RFID tag from which the tag response was received by using a tag identifier included in the tag response received from the at least one RFID tag to query a database stored at a base station of the cellular network for the tag position of the at least one RFID tag, the tag position being stored in the database, and determining a position of the device based on the tag position, wherein the tag response is received in the frequency band licensed to the cellular network.

2. The method of claim 1, further comprising: receiving, by the device, scheduling information from the cellular network, and transmitting the signal to find the at least one RFID tag in accordance with the received scheduling information.

3. The method of claim 1, wherein determining the position comprises: establishing, based on the tag response, a distance between the device and an RFID tag from which the tag response was received.

4. The method of claim 1, wherein the position of the device is determined based on the tag position while the device is positioned indoor.

5. The method of claim 1, wherein the tag response is received in dedicated resources scheduled by the cellular network or wherein the tag response is received in a resource of a time-frequency resource grid that has predefined offsets along the time and frequency axes to a resource in which the signal was received.

6. The method of claim 1, wherein the transmission of the signal is initiated by: a request from a base station of the cellular network; and/or detection of an emergency situation.

7. The method of claim 1, wherein the cellular network schedules recurring time slots for repeated transmission of the signal in resources allocated to the cellular network.

8. The method of claim 1, where the at least one RFID tag includes a plurality of RFID tags including at least one stationary RFID tag and at least one mobile RFID tag.

9. A device, comprising:
   a wireless interface operative for communication with a radio access network of a cellular network, and
   an electronic circuit operative to control the wireless interface to transmit a resource allocation request to the cellular network to request allocation of wireless spectrum resources for transmission of a signal to find at least one RFID tag and to use the wireless spectrum resources allocated by the cellular network to transmit the signal from the device to the at least one RFID tag to find the at least one RFID tag, the signal having a frequency in a frequency band licensed to the cellular network,
   wherein the wireless interface is operative to receive a tag response from the at least one RFID tag in response to transmission of the signal, the tag response including a tag identifier and being received in the wireless spectrum resources allocated by the cellular network and being received in the frequency band licensed to the cellular network, to transmit a tag position request including the tag identifier to the cellular network to query a database stored at a base station of the cellular network for the tag position, to receive a response from the cellular network including tag position information, and to determine a position of the device based on the tag position information.

10. A system, comprising:
    a cellular network node operative to allocate wireless spectrum resources in a frequency band licensed to the cellular network;
    an RFID tag configured to include:
    a wireless interface configured to receive a signal having a frequency in the frequency band licensed to the cellular network, and
    a circuit configured to generate a tag response for transmission to a device in response to receipt of the signal, the tag response being received in the wireless spectrum resources allocated by the cellular network and being in the frequency band licensed to the cellular network, and the device configured to include:
    a wireless interface configured to communicate with a radio access network of the cellular network and the RFID tag, and an electronic circuit configured to control the wireless interface using the wireless spectrum resources allocated by the cellular network for transmission of the signal to find the RFID tag, wherein the wireless interface of the device is operative to receive a tag response from the RFID tag that includes a tag identifier, to transmit a tag position request including the tag identifier to the cellular network to query a database stored at the cellular network node for the tag position, to receive a response from the cellular network including tag position information, and to determine a position of the device based on the tag position information.

\* \* \* \* \*